US011460880B2

(12) United States Patent
Zarnowitz et al.

(10) Patent No.: US 11,460,880 B2
(45) Date of Patent: Oct. 4, 2022

(54) COVERS TO CONCEAL INNER PORTIONS OF APPARATUSES

(71) Applicant: Hewlett-Packard Development Company, L.P., Spring, TX (US)

(72) Inventors: Arthur Zarnowitz, Palo Alto, CA (US); Henry Chu, Palo Alto, CA (US); Victor Su, Taipei (TW); Marcus Hoggarth, Palo Alto, CA (US); Isaac Teece, Palo Alto, CA (US); Andrew Guscott, Palo Alto, CA (US); Harc Lee, Palo Alto, CA (US); Gianluca Berruti, Palo Alto, CA (US); Kang-Han Cheng, Palo Alto, CA (US); Sung-Hsuan Weng, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 47 days.

(21) Appl. No.: 16/481,958

(22) PCT Filed: Apr. 30, 2018

(86) PCT No.: PCT/US2018/030312
§ 371 (c)(1),
(2) Date: Jul. 30, 2019

(87) PCT Pub. No.: WO2019/212522
PCT Pub. Date: Nov. 7, 2019

(65) Prior Publication Data
US 2021/0341964 A1    Nov. 4, 2021

(51) Int. Cl.
*G06F 1/16* (2006.01)
*F16M 11/20* (2006.01)

(52) U.S. Cl.
CPC ....... *G06F 1/1601* (2013.01); *F16M 11/2021* (2013.01); *F16M 2200/068* (2013.01)

(58) Field of Classification Search
CPC ............. G06F 1/1601; F16M 11/2021; F16M 2200/068; F16M 2200/08; F16M 11/10; F16M 11/38; F16M 13/00
See application file for complete search history.

(56) References Cited

U.S. PATENT DOCUMENTS

| | | |
|---|---|---|
| 5,206,790 A | 4/1993 | Thomas et al. |
| 5,646,818 A | 7/1997 | Hahn |
| 5,918,957 A | 7/1999 | Bovio et al. |
| 6,557,958 B1 | 5/2003 | Motta et al. |

(Continued)

FOREIGN PATENT DOCUMENTS

| | | |
|---|---|---|
| CN | 1463012 A | 12/2003 |
| CN | 103782249 A | 5/2014 |

(Continued)

*Primary Examiner* — Rockshana D Chowdhury
(74) *Attorney, Agent, or Firm* — Brooks Cameron & Huebsch PLLC (57) ABSTRACT

In some examples, an apparatus can include an arm and a cover connected to the arm, where the cover conceals an inner portion of the apparatus when the arm is in a vertical orientation relative to a base of the apparatus, and the cover is concealed in the inner portion of the apparatus when the arm is in a horizontal orientation relative to the base of the apparatus.

14 Claims, 4 Drawing Sheets

(56) References Cited

U.S. PATENT DOCUMENTS

| | | | |
|---|---|---|---|
| 6,927,972 B1 | 8/2005 | Wang et al. | |
| 7,715,180 B2 | 5/2010 | Titzler et al. | |
| 9,529,384 B1 | 12/2016 | Liang et al. | |
| 11,118,729 B2 * | 9/2021 | Zebarjad | F16M 13/022 |
| 2008/0137273 A1 | 6/2008 | Li et al. | |
| 2010/0243850 A1 | 9/2010 | Derry | |
| 2013/0321993 A1 * | 12/2013 | Liu | H05K 5/03 |
| | | | 361/679.01 |
| 2014/0197298 A1 * | 7/2014 | Chen | F16M 11/10 |
| | | | 248/558 |
| 2017/0064855 A1 | 3/2017 | Tehranchi | |
| 2019/0326767 A1 * | 10/2019 | Fan | F16M 11/10 |
| 2021/0156513 A1 * | 5/2021 | Borg | F16M 11/10 |

FOREIGN PATENT DOCUMENTS

| | | |
|---|---|---|
| CN | 105164600 A | 12/2015 |
| GB | 2490183 | 4/2014 |
| WO | WO-2015016816 | 2/2015 |
| WO | WO-2017180537 A1 | 10/2017 |

* cited by examiner

COVERS TO CONCEAL INNER PORTIONS OF APPARATUSES

BACKGROUND

Electronic devices may include a display. A display can present images, text, and/or video to a user. Some displays may allow a user to input information to the electronic device via the display. In such an example, the electronic device may include an apparatus to alter a viewing angle of the display. The altered viewing angle can allow a user to input information to the electronic device via the display.

DETAILED DESCRIPTION

Electronic devices such as laptops, phablets, convertibles, and other types of computing devices may include a display. An electronic device may include rotatable components to view the display at various angles. As used herein, the term "display" refers to a device which can provide visual information to a user and/or receive information from a user. A display can include a graphical user interface (GUI) that can provide information to and/or receive information from a user.

A display can be rotatable to facilitate receiving information from a user. For instance, a display may be rotatable such that a user can input information to the electronic device via a stylus or other input mechanism. In some examples, a display can be rotated such that the display may be viewed at various angles.

When a display is in a particular orientation, inner components of a mechanism to allow for rotation of the display may be visible. The visibility of the inner components of the rotation mechanism may be aesthetically undesirable.

An apparatus with covers to conceal an inner portion of the apparatus can allow for rotation of a display while concealing inner components of a rotation mechanism of the display. For example, the cover can conceal the inner portion of the apparatus when the display is in a particular orientation. When the display is rotated to a different orientation, the cover can be concealed in the apparatus. Allowing the cover to conceal the inner portion of the apparatus in one orientation of the display and concealing the cover when the display is in a different orientation can provide for an aesthetically desirable apparatus.

Figure 1:
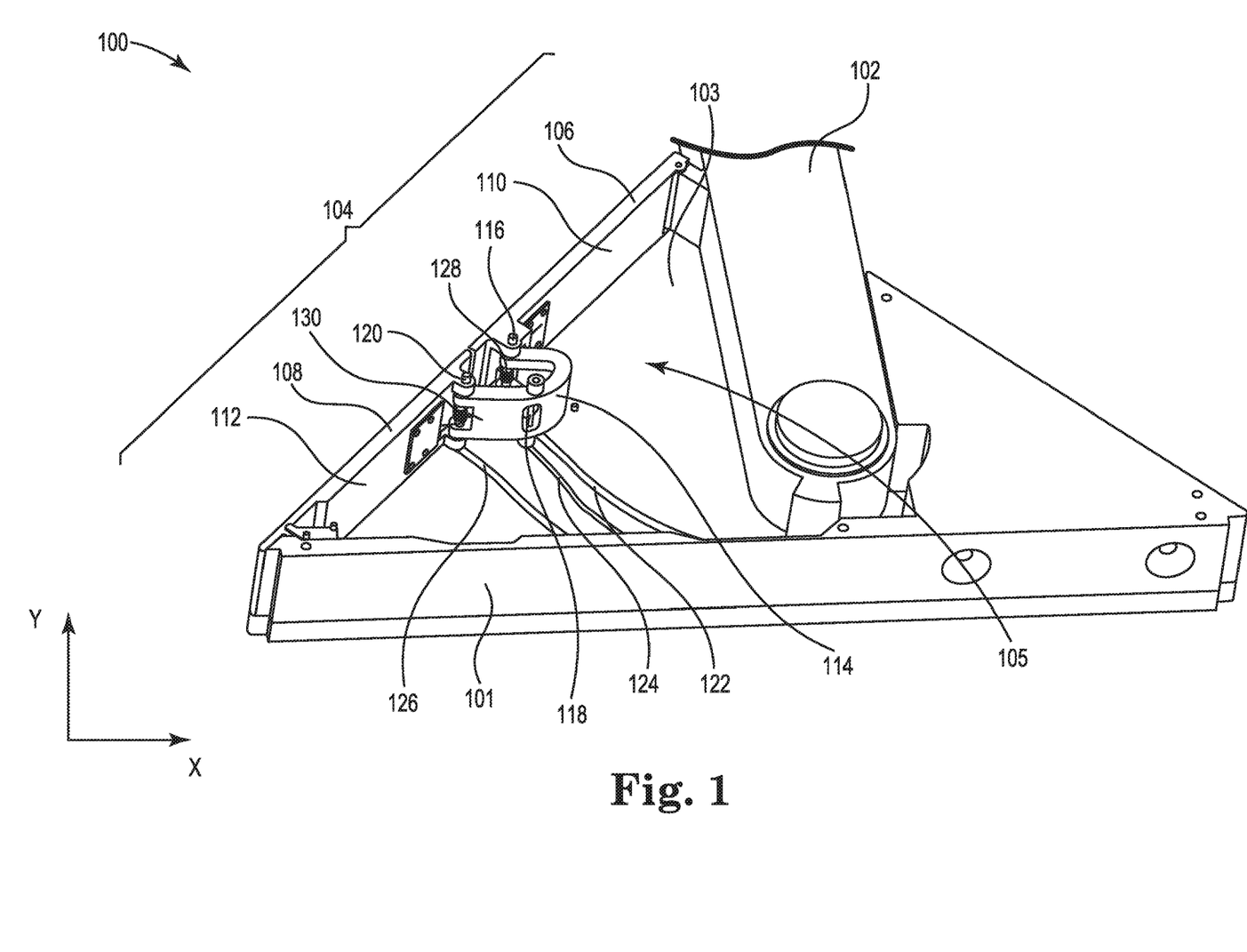
FIG. 1 illustrates a perspective view of an example of an apparatus with covers to conceal an inner portion of the apparatus consistent with the disclosure.

FIG. 1 illustrates a perspective view of an example of an apparatus 100 with covers to conceal an inner portion of the apparatus 100 consistent with the disclosure. Apparatus 100 can include a base 101, arm 102, sidewalls 103, cover 104, top channel 122, middle channel 124, and bottom channel 126. Cover 104 can include top door 106, bottom door 108, and hinge 114. Hinge 114 can include first pin 116, second pin 118, and third pin 120. First pin 116 can include torsion spring 128. Second pin 118 can include torsion spring 130.

As illustrated in FIG. 1, apparatus 100 can include arm 102. As used herein, the term "arm" refers to a structural member. Arm 102 can be connected to a display, as is further described in connection with FIGS. 2 and 3.

Arm 102 can be connected to cover 104. As used herein, the term "cover" can, refers to a piece of material to veil from sight another piece of material or cavity. For example, cover 104 can veil from sight inner portion 105 of apparatus 100.

Cover 104 can conceal inner portion 105 of apparatus 100 when arm 102 is in a particular orientation. For example, as illustrated in FIG. 1, arm 102 can be oriented in a vertical orientation relative to base 101. As used herein, the term "base" refers to a bottom support of apparatus 100. In the vertical orientation, cover 104 can veil from sight inner portion 105 of apparatus 100, which can provide for an aesthetically desirable apparatus 100 when arm 102 is in the vertical orientation.

Cover 104 can be concealed in the inner portion 105 of apparatus 100 when arm 102 is in a different orientation. For example, when arm 102 is rotated to a horizontal orientation relative to base 101 of apparatus 100, cover 104 can be concealed in the inner portion 105 of apparatus 100, as is further described in connection with FIGS. 3 and 4B.

The vertical orientation of arm 102 and horizontal orientation of arm 102 can be measured relative to base 101 of apparatus 100. For example, as illustrated in FIG. 1, arm 102 can be oriented vertically, or substantially vertically, relative to base 101. As used herein, the term "substantially" intends that the characteristic does not have to be absolute, but is close enough so as to achieve the characteristic. For example, "substantially vertical" is not limited to absolute vertical. Further, "substantially horizontal" is not limited to absolutely horizontal. For instance, arm 102 can be no more than 0.5°, 1°, 2°, 5°, or 10°, etc. of absolutely vertical. Further, "substantially horizontal" is not limited to absolutely horizontal. For instance, arm 102 can be no more than 0.5°, 1°, 2°, 5°, or 10°, etc. of absolutely horizontal.

As illustrated in FIG. 1, apparatus 100 can include a housing. As used herein, the term "housing" refers to a casing of a mechanism.

The housing can include a top door 106 and a bottom door 108. As used herein, the term "door" refers to a movable barrier to close off an area. For example, top door 106 and bottom door 108 can close off inner portion 105 of apparatus 100.

Top door 106 can be connected to arm 102. For example, in the orientation illustrated in FIG. 1, top door 106 can include a top portion and a bottom portion. The top portion of top door 106 can be located nearer to arm 102 than the bottom portion of top door 106. Top door 106 can be connected to arm 102 at a top portion of top door 106.

Bottom door 108 can be located adjacent to top door 106 and oriented in a lengthwise manner with respect to top door 106. As used herein, the term "lengthwise" refers to an orientation in a direction parallel with an object's length. For example, bottom door 108 can be oriented in a direction parallel with a length of top door 106. In the orientation illustrated in FIG. 1, bottom door 108 can include a top portion and a bottom portion. The top portion of bottom door 108 can be located nearer to arm 102 than the bottom portion of bottom door 108.

Top door 106 and bottom door 108 can be connected via hinge 114. As used herein, the term "hinge" refers to a mechanical bearing that connects two objects to allow an angle of rotation between the two objects. For example, hinge 114 can connect top door 106 with bottom door 108 to allow for an angle of rotation between top door 106 and bottom door 108, as is further described in connection with FIGS. 3 and 4B. Hinge 114 can be connected to a bottom portion of top door 106 and to a top portion of bottom door 108.

Apparatus 100 can include sidewall 103. As used herein, the term "sidewall" refers to a wall that serves as a side of a structure. For example, sidewall 103 can be a material with a surface that serves as a side of apparatus 100. Although not illustrated in FIG. 1 for clarity and so as not to obscure examples of the disclosure, apparatus 100 can include two sidewalls 103. Sidewalls 103 can be located parallel to each other and function to close off inner portion 105 of apparatus 100 on the sides of apparatus 100.

Sidewall 103 can include a plurality of channels 122, 124, 126. As used herein, the term "channel" refers to a groove in a surface of a material. For example, sidewall 103 can include top channel 122, middle channel 124, and bottom channel 126. As illustrated in FIG. 1, channel 122, channel 124, and channel 126 can include unique shapes. The unique shapes of channels 122, 124, and 126 can facilitate movement of hinge 114 in response to rotation of arm 102, as is further described in connection with FIGS. 2 and 3.

As previously described above, apparatus 100 can include two sidewalls 103. Although not illustrated in FIG. 1 for clarity and so as not to obscure examples of the disclosure, both sidewalls 103 can include channels 122, 124, and 126. For example, sidewall 103 illustrated in FIG. 1 can include channel 122, and the sidewall 103 not illustrated in FIG. 1 can include a channel that is the same shape as channel 122 but located in a surface of the sidewall 103 not illustrated in FIG. 1 but located opposite of the sidewall 103 illustrated in FIG. 1. Additionally, sidewall 103 illustrated in FIG. 1 can include channel 124, and the sidewall 103 not illustrated in FIG. 1 can include a channel that is the same shape as channel 124 but located in a surface of the sidewall 103 not illustrated in FIG. 1 but located opposite of the sidewall 103 illustrated in FIG. 1. Further, sidewall 103 illustrated in FIG. 1 can include channel 126, and the sidewall 103 not illustrated in FIG. 1 can include a channel that is the same shape as channel 126 but located in a surface of the sidewall 103 not illustrated in FIG. 1 but located opposite of the sidewall 103 illustrated in FIG. 1.

The shape of channels 122, 124, and 126 can be a curved "S" shape. However, as illustrated in FIG. 1, the curved "S" shapes of channels 122, 124, and 126 may not be the same. For instance, the slopes and curves of channel 122 can be different than the slopes and curves of channels 124 and/or 126.

Although the shape of channels 122, 124, and 126 are illustrated in FIG. 1 as being curved "S" shapes, examples of the disclosure are not so limited. For example, channels 122, 124, and 126 can be any other shape to facilitate movement of hinge 114 in response to rotation of arm 102, as is further described in connection with FIGS. 2 and 3.

Hinge 114 can include a plurality of pins 116, 118, and 120. As used herein, the term "pin" refers to a rod to allow for movement of parts in a particular manner relative to each other. In some examples, pins 116 and 120 can be located in holes of adjacent parts in order to fasten the parts together while allowing for movement of the parts in a particular manner relative to each other.

Hinge 114 can be connected to top door 106 via pin 116. For instance, the bottom portion of top door 106 can include holes and hinge 114 can include holes such that pin 116 is located in the holes of top door 106 and hinge 114 to fasten hinge 114 and top door 106 together. Pin 116 can allow for movement of top door 106 relative to hinge 114 as arm 102 is rotated from the vertical orientation to a horizontal orientation, as is further described in connection with FIG. 3.

Similarly, hinge 114 can be connected to bottom door 108 via pin 120. For instance, the top portion of bottom door 108 can include holes and hinge 114 can include holes such that pin 120 is located in the holes of bottom door 108 and hinge 114 to fasten hinge 114 and bottom door 108 together. Pin 120 can allow for movement of bottom door 108 relative to hinge 114 as arm 102 is rotated from the vertical orientation to a horizontal orientation, as is further described in connection with FIG. 3.

As described above, hinge 114 can further include pin 118. Pin 118 can be located in holes of hinge 114. Portions of pin 118 can overlap the holes of hinge 114 such that they are located in channel 124. For example, a width (e.g., a diameter) of pin 118 can be slightly smaller than a width of channel 124 such that pin 118 can be located in channel 124.

Similar to pin 118 and as described above, pins 116 and 120 can be located in holes of hinge 114. Additionally, portions of pins 116 and 120 can overlap the holes of hinge 114. The overlapping portions of pin 116 can be located in channel 122. For example, a width (e.g., a diameter) of pin 116 can be slightly smaller than a width of channel 122 such that pin 116 can be located in channel 122. Additionally, the overlapping portions of pin 120 can be located in channel 126, where a width of pin 120 can be slightly smaller than a width of channel 126 such that pin 120 can be located in channel 126.

Pins 116, 118, and 120, located in channels 122, 124, and 126, respectively, can guide top door 106, bottom door 108, and hinge 114 through a range of motion that occurs in response to rotation of arm 102 from the vertical orientation, as illustrated in FIG. 1, to a horizontal orientation. As used herein, the term "range of motion" refers to a distance that an object may travel while properly attached to another object. For example, as arm 102 rotates from the vertical orientation to a horizontal orientation, top door 106 and bottom door 108 can fold in on each other about hinge 114. As used herein, the term "fold" refers to bringing two pieces closer to each other. Channels 122, 124, and 126 can guide top door 106, bottom door 108, and hinge 114 as arm 102 rotates, concealing cover 104 in inner portion 105 of apparatus 100, as is further described in connection with FIG. 3.

Pin 116 can include torsion spring 128. As used herein, the term "spring" refers to a mechanical device that can store mechanical energy. Torsion spring 128 can be a spring that stores mechanical energy as a result of a torsional (e.g., rotational) force being applied to torsion spring 128.

Torsion spring 128 can provide a force on top door 106 when arm 102 is in a vertical orientation. For example, as illustrated in FIG. 1, arm 102 is located in the vertical orientation. Torsion spring 128 can have a rotational force applied to torsion spring 128 in the orientation illustrated in FIG. 1. As a result, torsion spring 128 can provide a reactive force to inner surface 110 of top door 106 when arm 102 is in the vertical orientation illustrated in FIG. 1.

Pin 120 can include torsional spring 130. Similarly, torsion spring 130 can provide a force on bottom door 108 when arm 102 is in a vertical orientation. For example, as illustrated in FIG. 1, arm 102 is located in the vertical orientation. Torsion spring 130 can have a rotational force applied to torsion spring 130 in the orientation illustrated in FIG. 1. As a result, torsion spring 130 can provide a reactive force to inner surface 112 of bottom door 108 when arm 102 is in the vertical orientation illustrated in FIG. 1.

The reactive forces applied by torsion spring 128 on top door 106 and torsion spring 130 on bottom door 108, respectively, can allow for top door 106 to be oriented lengthwise with respect to bottom door 108, and vice versa when arm 102 is in the vertical orientation. In other words, torsion springs 128 and 130 can provide forces to bias top door and bottom door 108 in a "negative" X-direction and a "positive" Y-direction as indicated by the X-Y coordinate plane illustrated in FIG. 1. The forces provided by torsion springs 128 and 130 on top door 106 and bottom door 108, respectively, can prevent top door 106 and bottom door 108 from sagging towards inner portion 105 of apparatus 100, which can provide for an aesthetically desirable cover for apparatus 100. When arm 102 is rotated to a horizontal orientation, torsion springs 128 and 130 no longer apply a force to top door 106 and bottom door 108, respectively.

Arm 102 can be rotated. For example, arm 102 can be rotated from a vertical orientation (e.g., as illustrated in FIG. 1) to a horizontal orientation relative to base 101 of apparatus 100. Channels 122, 124, and 126 can guide top door 106, bottom door 108, and hinge 114 as top door 106 and bottom door 108 fold in on each other in response to arm 102 being rotated from the vertical orientation to a horizontal orientation, as is further described in connection with FIG. 3.

Figure 2:
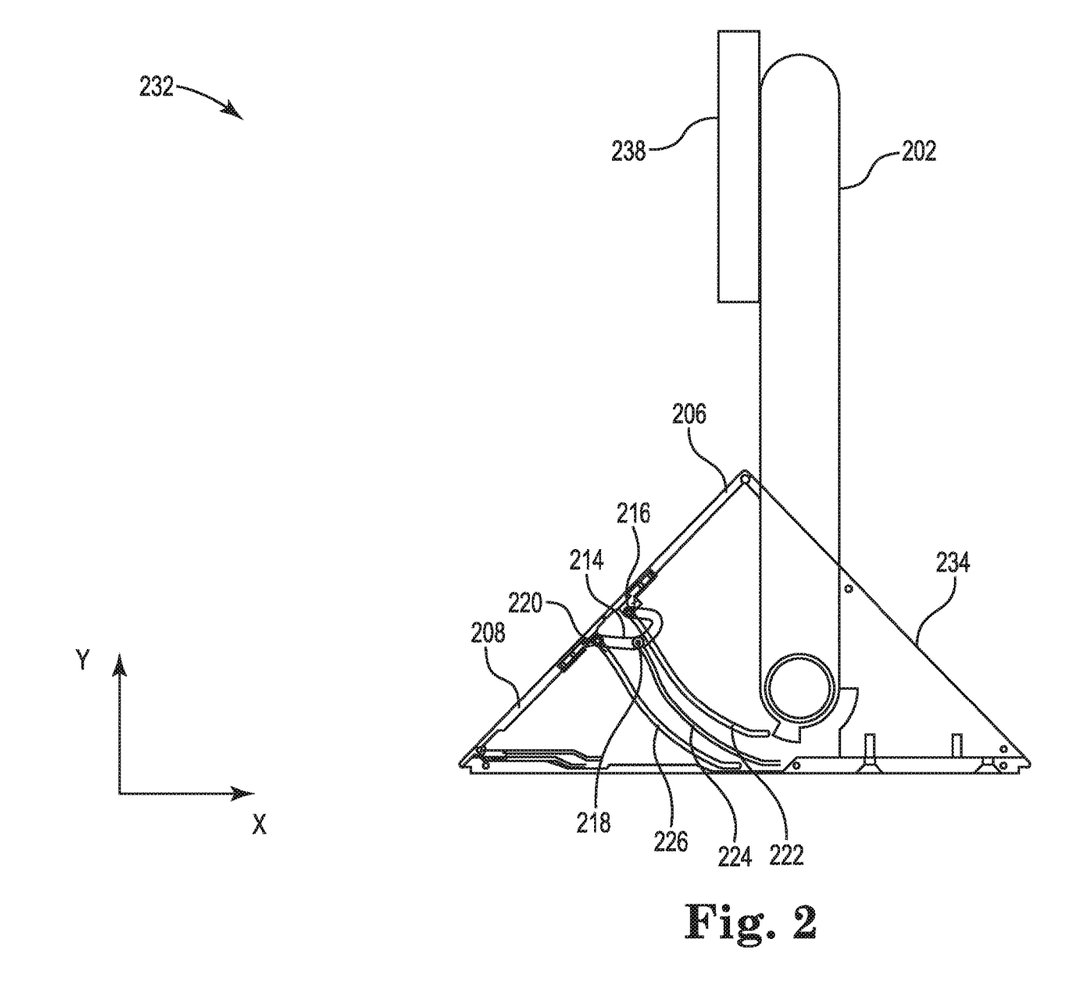
FIG. 2 illustrates a side view of an example of a system with covers to conceal an inner portion of an apparatus consistent with the disclosure.

FIG. 2 illustrates a side view of an example of a system 232 with covers to conceal an inner portion of an apparatus consistent with the disclosure. The system 232 can include arm 202, housing 234, and display 238. Housing 234 can include top door 206, bottom door 208, hinge 214, and channels 222, 224, 226. Hinge 214 can include pins 216, 218, and 220.

As previously described in connection with FIG. 1, arm 202 can be connected to top door 206 of housing 234. As illustrated in FIG. 2, arm 202 can be oriented in a vertical orientation. Hinge 214 can connect top door 206 and bottom door 208.

Hinge 214 can include pins 216, 218, and 220. Hinge 214 can be connected to top door 206 via pin 216 and connected to bottom door 208 via pin 220.

Housing 234 can include channels 222, 224, and 226. Each channel 222, 224, and 226 can include a unique shape. For example, as previously described in connection with FIG. 1, each channel 222, 224, and 226 can include a unique curved "S" shape. The unique "S" shapes of channels 222, 224, and 226 can be different in order to guide top door 206, bottom door 208, and hinge 214 through a range of motion as arm 202 is rotated from the vertical orientation to a horizontal orientation, as is further described in connection with FIG. 3.

Pin 216 can connect hinge 214 to a bottom portion of top door 206. Pin 216 can be located in top channel 222. Pin 220 can connect hinge 214 to a top portion of bottom door 208. Pin 220 can be located in bottom channel 226. Pin 218 can be located in middle channel 224.

Top channel 222 can guide pin 216, middle channel 224 can guide pin 218, and bottom channel can guide pin 220 as top door 206, bottom door 208, and hinge 214 move through a range of motion as arm 202 rotates through a range of motion from a vertical orientation (e.g., as illustrated in FIG. 2) to a horizontal orientation to cause top door 206 and bottom door 208 to fold in on each other. For example, arm 202 can rotate to a horizontal orientation (e.g., in a counter-clockwise direction relative to the orientation of system 232 as illustrated in FIG. 2). Channels 222, 224, and 226 can guide pins 216, 218, and 220, respectively, as top door 206 and bottom door 208 to fold in on each other, as is further described in connection with FIG. 3.

For example, as arm 202 begins to rotate (e.g., in a counter-clockwise direction) towards the horizontal orientation, a torque can be applied to top door 206 by arm 202 in a "negative" X-direction as indicated by the X-Y coordinate plane illustrated in FIG. 2. The torque applied to top door 206 can cause top door 206 to begin to rotate (e.g., in a counter-clockwise direction) about hinge 214. Top door 206 can begin to rotate before bottom door 208. The rotation of top door 206 prior to the rotation of bottom door 208 beginning can prevent top door 206 and bottom door 208 from crashing into each other during rotation.

The rotation of top door 206 can cause a force to be applied to bottom door 208 by top door 206 in a "positive" X-direction. The forces discussed above can cause top door 206 and bottom door 208 to fold in on each other, as is further described in connection with FIG. 3.

As illustrated in FIG. 2, display 238 can be connected to arm 202. Display 238 can be oriented in a vertical orientation relative to the base of housing 234. Display 238 can be rotated as arm 202 is rotated from the vertical orientation to a horizontal orientation, as is further described in connection with FIG. 3.

Figure 3:
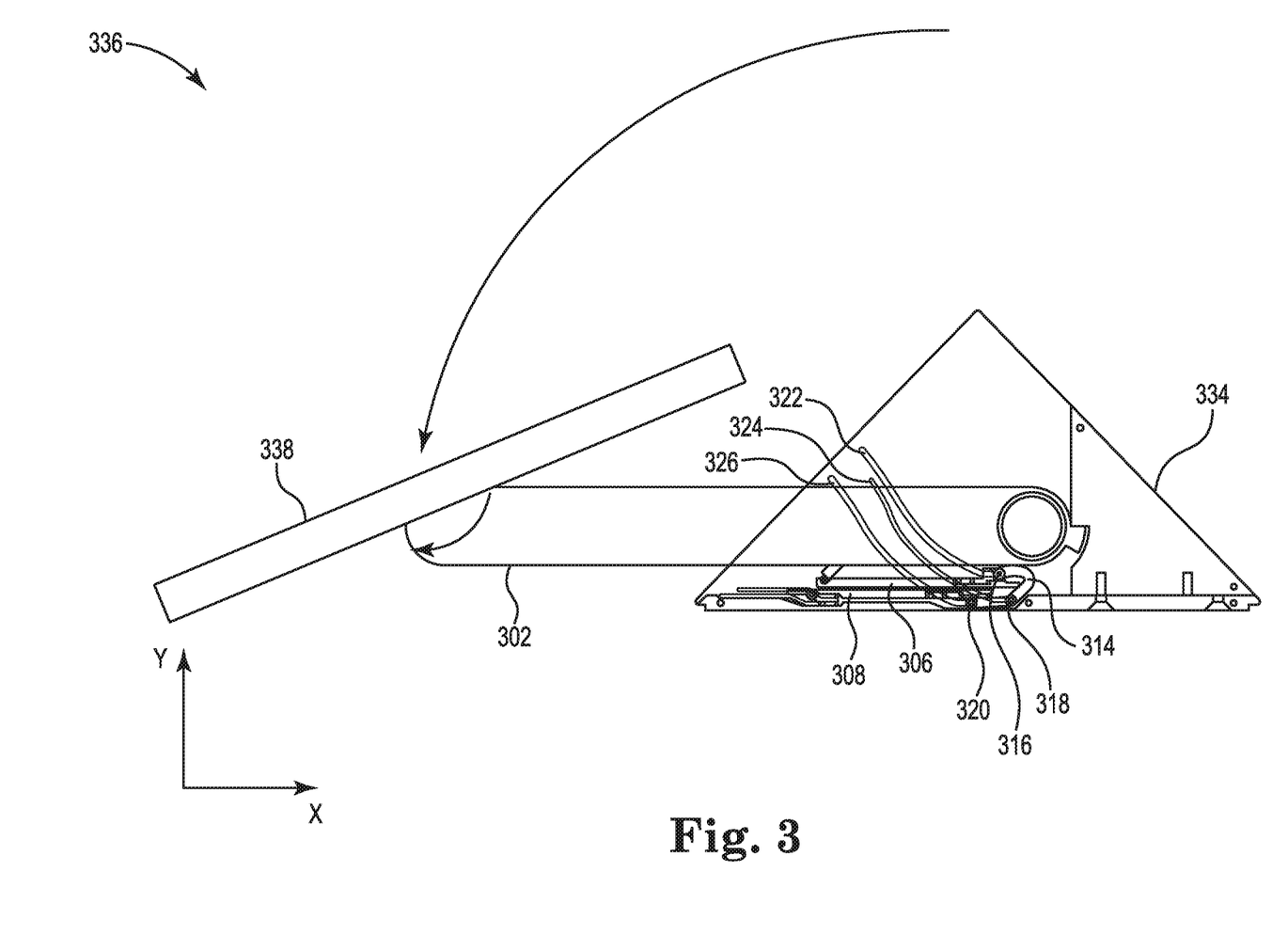
FIG. 3 illustrates a side view of an example of a computing device with covers to conceal an inner portion of an apparatus consistent with the disclosure.

FIG. 3 illustrates a side view of an example of a computing device with covers to conceal an inner portion of an apparatus consistent with the disclosure. The computing device 336 can include arm 302, housing 334, and display 338. Housing 334 can include top door 306, bottom door 308, hinge 314, and channels 322, 324, 326. Hinge 314 can include pins 316, 318, 320.

Similar to the apparatus and system described in connection with FIGS. 1 and 2, respectively, computing device 336 can include arm 302. Arm 302 can be connected to top door 306. Display 338 can be connected to arm 302.

As illustrated in FIG. 3, arm 302 can rotate from a vertical orientation (e.g., as previously illustrated and described in connection with FIGS. 1 and 2) to a horizontal orientation relative to a base of housing 334. In the vertical orientation, arm 302 can rotate towards top door 306 and bottom door 308, causing top door 306 and bottom door 308 to fold in on each other about hinge 314. In other words, arm 302 can rotate in a counter-clockwise direction from the vertical position to the horizontal position illustrated in FIG. 3.

Top door 306 and bottom door 308 can fold in on each other about hinge 314 in response to rotation of arm 302 from a vertical orientation to a horizontal orientation. For example, top door 306 and bottom door 308 can rotate relative to each other about hinge 314 such that top door 306 and bottom door 308 are brought closer to each other.

Top door 306 and bottom door 308 can fold in on each other in response to rotation of arm 302. As previously described in connection with FIG. 2, as arm 302 begins to rotate (e.g., in a counter-clockwise direction) towards the horizontal orientation, a torque is applied in a "negative" X-direction as indicated by the X-Y coordinate plane illustrated in FIG. 3. The torque can cause top door 306 to begin to rotate about hinge 314. Top door 306 can rotate about hinge 314 prior to bottom door 308. The rotation of top door 306 prior to the rotation of bottom door 308 beginning can prevent top door 306 and bottom door 308 from crashing into each other as they fold towards each other.

At a point, the rotation of top door 306 can cause a force to be applied to bottom door 308 by top door 306 in a "positive" X-direction, causing bottom door 308 to rotate (e.g., in a clockwise direction). As a result, the top door 306 and bottom door 308 can fold in on each other as a result of the rotation of arm 302 in a counter-clockwise direction.

As bottom door 308 is folded in towards top door 306, a bottom portion of bottom door 308 can slide linearly in a "positive" X-direction. For example, as a top portion of bottom door 308 rotates about hinge 314, the bottom portion of bottom door 308 can slide linearly in a "positive" X-direction.

Although not illustrated in FIG. 3 for clarity and so as not to obscure examples of the disclosure, top door 306 can include an outer surface and bottom door 308 can include an outer surface. The outer surfaces of top door 306 and bottom door 308 can be surfaces that are opposite to the inner surfaces (e.g., inner surface 110 and inner surface 112 of top door 106 and bottom door 108, respectively, as previously described in connection with FIG. 1) of top door 306 and bottom door 308. As arm 302 moves towards the horizontal orientation, the outer surfaces of top door 306 and bottom door 308 can fold in towards each other. When arm 302 is in the horizontal orientation, the outer surface of top door 306 can be adjacent to the outer surface of bottom door 308.

Hinge 314 can include pins 316, 318, and 320. Pins 316, 318, and 320 can be located in channels 322, 324, 326, respectively. The unique shape of channels 322, 324, and 326 can guide top door 306, bottom door 308, and hinge 314 as top door 306 and bottom door 308 fold in towards each other in response to rotation of arm 302 from the vertical orientation to the horizontal orientation.

As previously described in connection with FIG. 1, the pins can include a diameter that is slightly smaller than the width of the corresponding channel the pins are located in. For example, pin 316 can include a slightly smaller diameter than the width of top channel 322, pin 318 can include a slightly smaller diameter than the width of middle channel 324, and pin 320 can include a slightly smaller diameter than the width of bottom channel 326.

In some examples, the diameter of pin 316 can be different than the diameter of pin 318 and/or pin 320. For example, the diameter of pin 316 can be slightly larger than the diameter of pins 318 and 320. As a result, pin 316 can be located in top channel 322 having an interference fit in top channel 322.

As a result of the interference fit of pin 316 in top channel 322, when arm 302 begins to rotate in a counter-clockwise direction, top door 306 can begin to rotate before bottom door 308. The friction caused by the interference fit of pin 316 in top channel 322 can further cause rotation of top door 306 prior to the rotation of bottom door 308 beginning, which can help to prevent top door 306 and bottom door 308 from crashing into each other as they fold towards each other.

As arm 302 is rotated towards the horizontal orientation, display 338 can be rotated to display information to a user of computing device 336. In some examples, display 338 can be oriented as illustrated in FIG. 3 to allow for a user to input information to computing device 336 via display 338. For example, display 338 can be oriented such that a user can input information via a touch-screen GUI of display 338 utilizing a stylus or other input mechanism. The orientation of display 338 can allow for easier input via the stylus as compared to the vertical orientation of the display as illustrated in FIG. 2.

When arm 302 is in the horizontal orientation, top door 306 and bottom door 308 can be concealed in the inner portion of housing 334. Concealing top door 306 and bottom door 308 in the inner portion of housing 334 when display 338 and arm 302 are oriented as illustrated in FIG. 3 can provide for an aesthetically desirable apparatus.

In some examples, arm 302 can be rotated from the horizontal orientation (e.g., as illustrated in FIG. 3) back to the vertical orientation (e.g., as illustrated in FIG. 2). The unique shape of channels 322, 324, 326 can guide top door 306, bottom door 308, and hinge 314 through a range of motion as arm 302 is rotated towards the vertical orientation. As a result, top door 306 and bottom door 308 can rotate away from each other about hinge 314 as arm 302 is rotated from the horizontal orientation to the vertical orientation so that the top door can be oriented lengthwise with respect to the bottom door, as illustrated in FIG. 2.

Figure 4A:
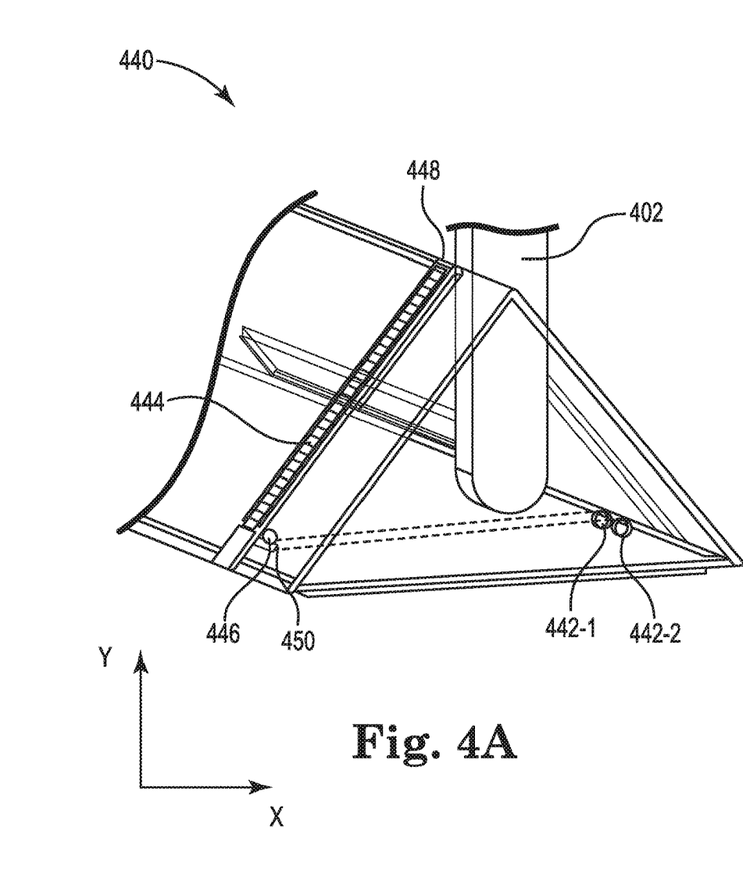
FIG. 4A illustrates a perspective view of an example of an apparatus with covers to conceal an inner portion of the apparatus consistent with the disclosure.

FIG. 4A illustrates a perspective view of an example of an apparatus 440 with covers to conceal an inner portion of the apparatus 440 consistent with the disclosure. The apparatus 440 can include arm 402, constant force spring 442-1, 442-2 (referred to collectively herein as constant force spring 442), cover 444, and corner 446. Cover 444 can include first end 448 and second end 450.

As illustrated in FIG. 4A, apparatus 440 can include arm 402. Similar to the arm previously described in FIGS. 1-3, arm 402 can be connected to a display.

Arm 402 can be connected to cover 444. Similar to the cover (e.g., the top door and bottom door) described in connection with FIGS. 1-3, cover 444 can conceal an inner portion of apparatus 440. Cover 444 can conceal an inner portion of apparatus 400 when arm 402 is in a vertical orientation. For example, as illustrated in FIG. 4A, arm 402 can be in a vertical orientation with respect to a base of apparatus 440.

Cover 444 can be a flexible material. As used herein, the term "flexible" refers to a material property that allows for the material to be capable of being bent, curved, or with its shape otherwise modified without breaking. For example, cover 444 can be curved about a corner 446 without breaking when arm 402 is rotated from the vertical orientation to a horizontal orientation, as is further described in connection with FIG. 4B.

In some examples, cover 444 can be a flexible fabric. For example, cover 444 can be a nylon, polyester, or other flexible fabric. In some examples, the flexible fabric can include a backing.

In some examples, cover 444 can be a flexible mesh. For example, cover 444 can be a barrier including connected strands of metal, fiber, or other flexible materials. In some examples, the flexible mesh can include a backing.

In some examples, cover 444 can be a flexible slatted cover. For example, cover 444 can include a series of pieces of material that can fit next to each other and be interlocked via a series of pins, where the series of pieces of material can be flexible about the series of pins.

Cover 444 can include a first end 448. In the orientation illustrated in FIG. 4A, first end 448 can be a top portion of cover 444. Cover 444 can be connected to arm 402 at the first end 448 of cover 444.

Cover 444 can include a second end 450. In the orientation illustrated in FIG. 4A, second end 450 can be a bottom portion of cover 444. Cover 444 can be connected to constant force spring 442 at second end 450 of cover 444. As used herein, the term "constant force spring" refers to a pre-stressed flat strip of spring material (e.g., steel or other material) formed into constant radius coils such that, when the strip of material is extended (e.g., deflected), the coils resist the deflection force.

For example, in the orientation illustrated in FIG. 4A, a portion of constant force spring 442 can be connected to second end 450 of cover 444. As a result of the vertical orientation of arm 402, the portion of constant force spring 442 can be deflected. As a result of the orientation illustrated in FIG. 4A, constant force spring 442 can resist the deflection force being generated on constant force spring 442 by cover 444.

In other words, in the orientation illustrated in FIG. 4A, the constant force spring 442 can deflect to keep the flexible material of cover 444 taut such that the cover conceals the inner portion of apparatus 440. As used herein, the term "taut" refers to tightly drawn. For instance, cover 444 can be tightly drawn so that cover 444 does not sag in the orientation illustrated in FIG. 4A.

In some examples, cover 444 can be attached to an extension spring. As used herein, the term "extension spring" refers to a spring with wire in a cylindrical helical orientation that provides a force when the extension spring is extended or pulled. For instance, an extension spring can be connected to second end 450 of cover 444. As a result of the vertical orientation of arm 402, the extension spring can be extended. As a result of the orientation illustrated in FIG. 4A, the extension spring can resist the extension force being generated on the extension spring by cover 444.

Arm 402 can be rotated from the vertical orientation (e.g., as illustrated in FIG. 4A) to a horizontal orientation. For example, arm 402 can rotate counter-clockwise from the horizontal orientation to a vertical orientation. As a result of the rotation of arm 402, cover 444 can be concealed in an inner portion of apparatus 440, as is further described in connection with FIG. 4B.

Figure 4B:
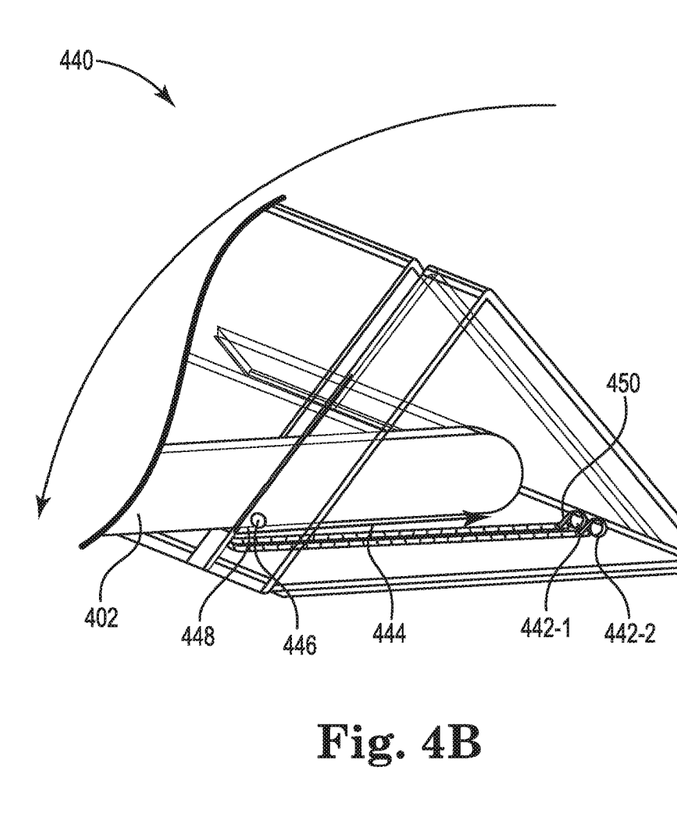
FIG. 4B illustrates a perspective view of an example of an apparatus with covers to conceal an inner portion of the apparatus consistent with the disclosure.

FIG. 4B illustrates a perspective view of an example of an apparatus 440 with covers to conceal an inner portion of the apparatus 440 consistent with the disclosure. The apparatus 440 can include arm 402, constant force spring 442-1, 442-2, cover 444, and corner 446. Cover 444 can include first end 448 and second end 450.

As previously described in connection with FIG. 4A, arm 402 can rotate from a vertical orientation to a horizontal orientation. As illustrated in FIG. 4B, arm 402 can be in the horizontal orientation.

As a result of the rotation of arm 402 from the vertical orientation to the horizontal orientation, arm 402 can generate a force on cover 444 as a result of first end 448 of cover 444 being connected to arm 402. As arm 402 rotates, the coils of constant force spring 442 can begin to wind back into a coil, providing a pulling force on second end 450 of cover 444. As used herein, the term "wind" refers to coiling of a material around a point. For example, constant force spring 442 can begin to pull the deflected portion of constant force spring 442 back towards constant force spring 442, pulling second end 450 of cover 444 with it.

As arm 402 rotates towards the horizontal orientation, cover 444 can be pulled around corner 446 of apparatus 440, as illustrated in FIG. 4B. The flexible material of cover 444 can allow for cover 444 to be pulled around corner 446 without damaging or breaking cover 444.

In some examples, and as previously described in connection with FIG. 4A, the spring can be an extension spring. The extension spring can be extended when arm 402 is in a vertical orientation and can be retracted as arm 402 is rotated towards a horizontal orientation. The retraction of the extension spring can similarly pull cover 444 around corner 446.

As a result of the rotation of arm 402 from the vertical orientation to the horizontal orientation, cover 444 can be concealed in apparatus 440. Allowing the cover to conceal the inner portion of the apparatus in one orientation of the display and concealing the cover when the display is in a different orientation as a result of the arm being in a different orientation can provide for an aesthetically desirable apparatus.

In the foregoing detailed description of the disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the disclosure. Further, as used herein, "a" can refer to one such thing or more than one such thing.

The figures herein follow a numbering convention in which the first digit corresponds to the drawing figure number and the remaining digits identify an element or component in the drawing. For example, reference numeral 102 may refer to element 102 in FIG. 1 and an analogous element may be identified by reference numeral 202 in FIG. 2. Elements shown in the various figures herein can be added, exchanged, and/or eliminated to provide additional examples of the disclosure. In addition, the proportion and the relative scale of the elements provided in the figures are intended to illustrate the examples of the disclosure, and should not be taken in a limiting sense.

It can be understood that when an element is referred to as being "on," "connected to", "coupled to", or "coupled with" another element, it can be directly on, connected, or coupled with the other element or intervening elements may be present. In contrast, when an object is "directly coupled to" or "directly coupled with" another element it is understood that are no intervening elements (adhesives, screws, other elements) etc.

The above specification, examples and data provide a description of the method and applications, and use of the system and method of the disclosure. Since many examples can be made without departing from the spirit and scope of the system and method of the disclosure, this specification merely sets forth some of the many possible example configurations and implementations.

What is claimed is:

1. An apparatus, comprising:
   an arm; and
   a cover connected to the arm, wherein the cover includes:
      a top door connected to the arm;
      a bottom door; and
      a hinge connected to the top door and the bottom door;
   wherein:
      the cover conceals an inner portion of the apparatus when the arm is in a vertical orientation relative to a base of the apparatus;
      the cover is concealed in the inner portion of the apparatus when the arm is in a horizontal orientation relative to the base of the apparatus; and
      the arm is to rotate towards the top door and the bottom door to cause the top door to rotate and the bottom door to rotate such that the top door and the bottom door fold in on each other about the hinge from the vertical orientation to the horizontal orientation.

2. The apparatus of claim 1, wherein
a plurality of channels included in sidewalls of the apparatus are to guide the hinge, the top door, and the bottom door such that the top door and the bottom door fold in on each other about the hinge to conceal the cover in the inner portion of the apparatus as the arm rotates through a range of motion from the vertical orientation to the horizontal orientation.

3. The apparatus of claim 2, wherein the hinge includes a plurality of pins, wherein:
a first pin of the plurality of pins connects the hinge to a bottom portion of the top door, and wherein the first pin of the plurality of pins is located in a top channel of the plurality of channels;
a second pin of the plurality of pins is located in a middle channel of the plurality of channels;
a third pin of the plurality of pins connects the hinge to a top portion of the bottom door, and wherein the third pin of the plurality of pins is located in a bottom channel of the plurality of channels; and
the top channel is to guide the first pin, the middle channel is to guide the second pin, and the bottom channel is to guide the third pin as the arm rotates through a range of motion from the vertical orientation to the horizontal orientation to cause the top door and the bottom door to fold in on each other about the hinge.

4. The apparatus of claim 1, wherein the cover includes a flexible material with a first end and a second end, wherein the first end of the flexible material is connected to the arm and the second end of the flexible material is connected to a constant force spring included in the apparatus.

5. The apparatus of claim 4, wherein:
as the arm rotates through a range of motion from the horizontal orientation to the vertical orientation, the constant force spring is to deflect to keep the flexible material taut such that the cover conceals the inner portion of the apparatus; and
as the arm rotates through the range of motion from the vertical orientation to the horizontal orientation, the constant force spring is to wind to conceal the cover in the inner portion of the apparatus.

6. A system, comprising:
an arm;
a housing, including:
a cover connected to the arm, wherein the cover includes:
a top door connected to the arm at a top portion of the top door;
a bottom door; and
a hinge including a plurality of pins, wherein the hinge is connected to the top door via a first pin of the plurality of pins and connected to the bottom door via a third pin of the plurality of pins; and
a plurality of channels in sidewalls of the housing;
wherein the plurality of pins are located in the plurality of channels such that the plurality of channels guide the top door, the bottom door, and the hinge as the top door rotates and the bottom door rotates such that the top door and the bottom door are to fold in on each other about the hinge in response to rotation of the arm from a vertical orientation to a horizontal orientation relative to a base of the housing.

7. The system of claim 6, wherein the hinge further includes a second pin of the plurality of pins, and wherein the second pin is located in a channel of the plurality of channels to guide the top door, the bottom door, and the hinge as the top door and the bottom door fold in on each other about the hinge in response to rotation of the arm.

8. The system of claim 6, wherein the first pin includes a torsion spring.

9. The system of claim 8, wherein the torsion spring of the first pin applies a force to an inner surface of the top door such that the top door is oriented lengthwise with respect to the bottom door when the arm is in the vertical orientation.

10. The system of claim 6, wherein the third pin includes a torsion spring.

11. The system of claim 10, wherein the torsion spring of the third pin applies a force to an inner surface of the bottom door such that the bottom door is oriented lengthwise with respect to the top door when the arm is in the vertical orientation.

12. A computing device, comprising:
an arm;
a display connected to the arm; and
a housing, including:
a cover, wherein the cover includes:
a top door connected to the arm;
a bottom door; and
a hinge including a plurality of pins, wherein the hinge is connected to the top door via a first pin of the plurality of pins and connected to the bottom door via a third pin of the plurality of pins; and
a plurality of channels in sidewalls of the housing, wherein each channel of the plurality of channels includes a unique shape;
wherein the plurality of pins are located in the plurality of channels such that the unique shape of each of the plurality of channels is to guide each of the top door, the bottom door, and the hinge as the top door rotates and the bottom door rotates such that the top door and the bottom door fold in on each other about the hinge in response to rotation of the arm from a vertical orientation to a horizontal orientation relative to a base of the housing.

13. The computing device of claim 12, wherein:
the top door includes an outer surface and the bottom door includes an outer surface; and
the top door and the bottom door are to fold in on each other about the hinge such that the outer surface of the top door is adjacent to the outer surface of the bottom door in response to rotation of the arm from the vertical orientation to the horizontal orientation.

14. The computing device of claim 12, wherein the unique shape of each of the plurality of channels is to guide each of the top door, the bottom door, and the hinge as the top door and the bottom door fold away from each other about the hinge in response to rotation of the arm from the horizontal orientation to the vertical orientation such that the top door is oriented lengthwise with respect to the bottom door.

* * * * *